Jan. 8, 1924.  
O. HAYES  
1,480,066  
MANIFOLD FOR MOTOR CARS  
Filed Oct. 11, 1918   2 Sheets-Sheet 1
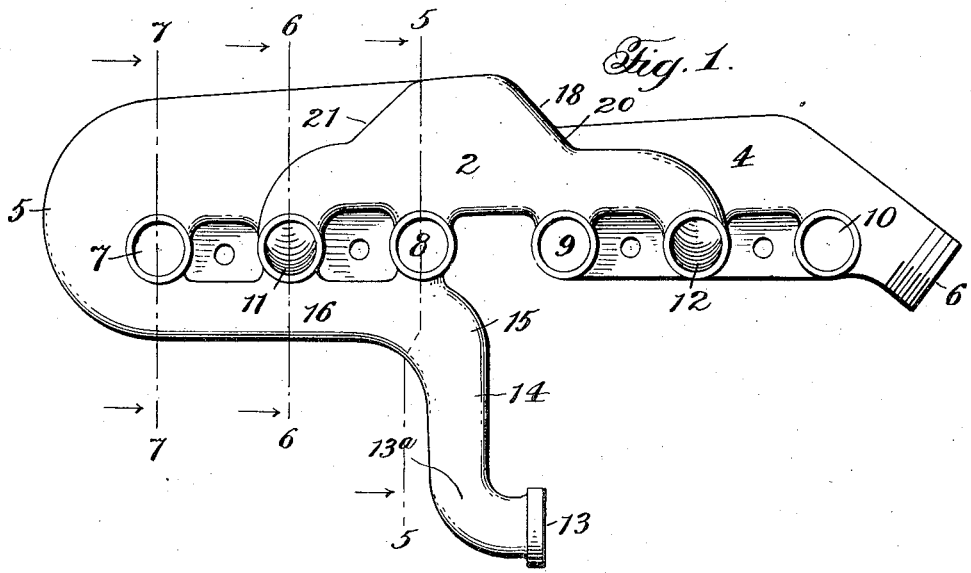
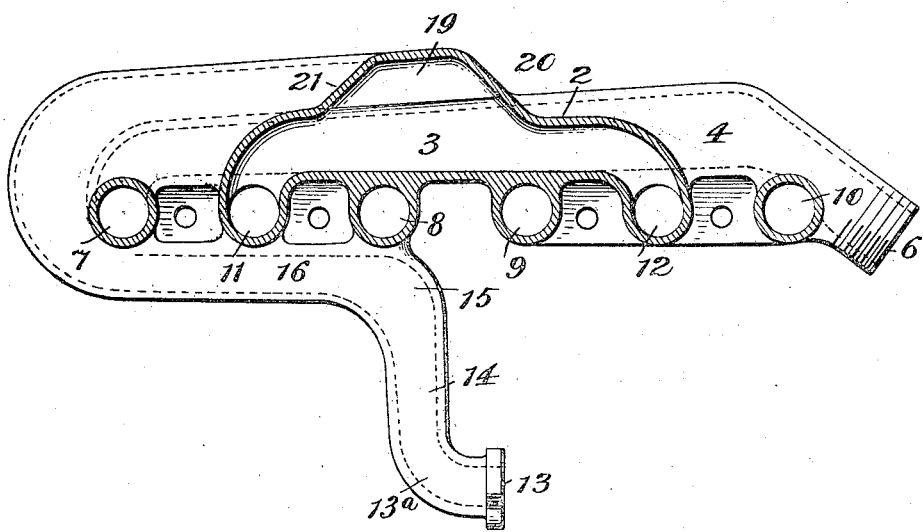
Witness:  
Jas. Hutchinson
Inventor:  
Oscar Hayes,  
By Milans & Milans,  
Attorneys:

Jan. 8, 1924.
O. HAYES
1,480,066
MANIFOLD FOR MOTOR CARS
Filed Oct. 11, 1918
2 Sheets-Sheet 2
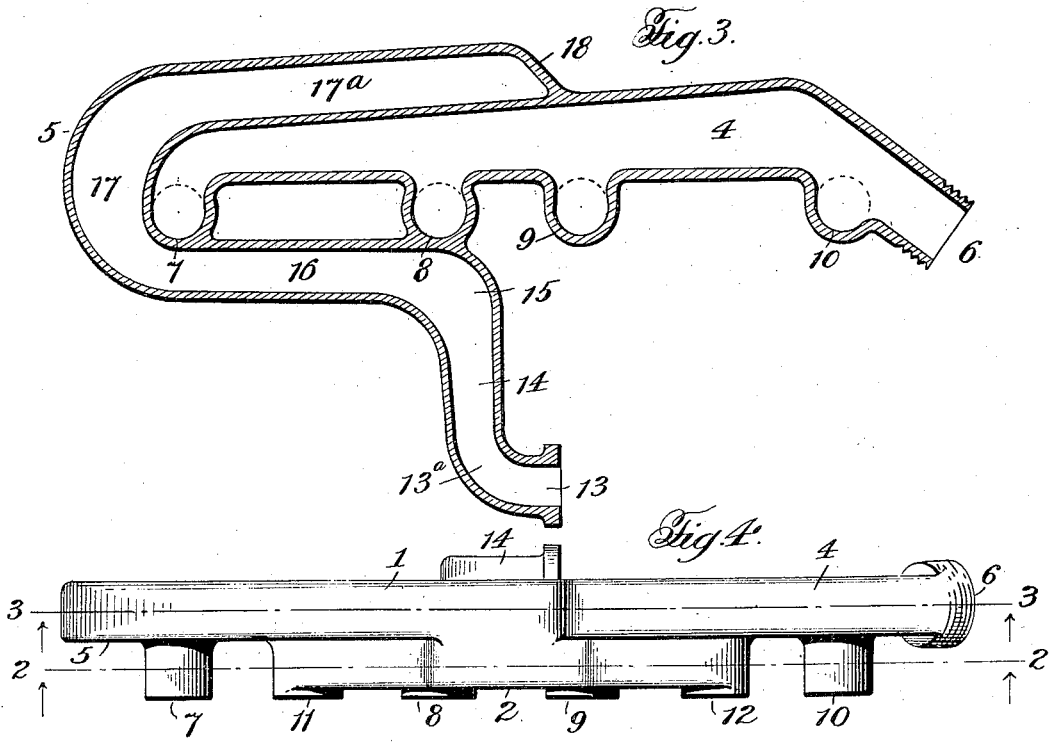
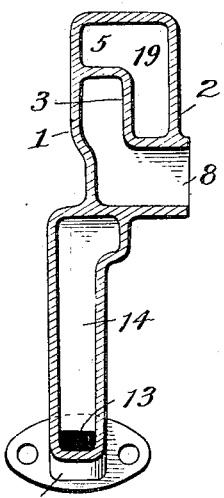 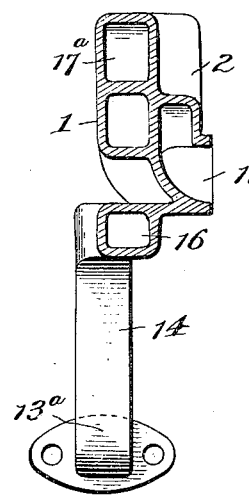 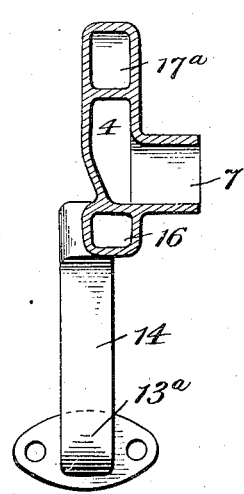

Patented Jan. 8, 1924.

1,480,066

UNITED STATES PATENT OFFICE.

OSCAR HAYES, OF JOHNSTOWN, PENNSYLVANIA.

MANIFOLD FOR MOTOR CARS.

Application filed October 11, 1918. Serial No. 257,740.

*To all whom it may concern:*

Be it known that I, OSCAR HAYES, a citizen of the United States, residing at Johnstown, in the county of Cambria and State of Pennsylvania, have invented certain new and useful Improvements in Manifolds for Motor Cars, of which the following is a specification, reference being had therein to the accompanying drawing.

This invention relates to manifolds for motor cars and the like, and more particularly to a combination intake and exhaust manifold.

It has heretofore been suggested in the art to form in a single casting an intake and exhaust manifold, certain of the walls of the exhaust manifold being adapted to be traversed by the incoming fuel in the intake manifold whereby to more thoroughly vaporize the same due to the heat of the walls of the exhaust manifold proper, and it is one of the primary objects of the present invention to improve upon structures of this type whereby the incoming fuel will be exposed to a vaporizing surface of extended area, in a novel and efficient manner whereby the fuel will be completely vaporized before entering the engine cylinders.

It is a further object of the invention to provide means in operative association with the manifold construction whereby the fuel as conducted from the carbureter to the manifold will be more thoroughly mixed thus assisting in the thorough vaporization of the same.

In carrying out the invention, it is proposed to give to a part of the incoming fuel posed to give to a part of the incoming fuel a circuitous course before its entrance into the motor cylinders and in its travel over said course to subject the same to the heat of the exhaust manifold thereby gradually increasing the temperature of the charge during its travel through the circuitous course so that complete vaporization takes place before the charge is admitted into the motor cylinders.

More particularly the invention includes an exhaust manifold, an intake manifold arranged to the side thereof, a common wall separating the manifolds, the combined manifold having a partition forming chambers, the one for the exhaust gases and the other for the fuel, the fuel chamber being in communication with the intake manifold and having operatively connected therewith a supply conduit curved around the closed end of the exhaust manifold and in contact therewith whereby to receive heat therefrom.

In the preferred embodiment of the invention illustrated the inlet or supply conduit for the fuel has a plurality of sweeping curves, the interior diameter of the conduit at the curves being somewhat greater than that of the major portion thereof whereby the fuel is subjected to a cycloidal action at the bends or curves of the conduit whereby to thoroughly mix the fuel.

Another important feature of the invention is to provide means whereby the fuel will be delivered to the intake manifold at a point closer to one of the outlet openings than the other, the outlet opening arranged in the general direction of the path of the fuel as it enters the manifold, being disposed more remotely than the other whereby a more equal supply to the outlet openings is maintained, as will be more fully appreciated from the description to follow and an inspection of the accompanying drawings.

Still further it is the object of the invention to generally improve upon manifolds of the character under consideration, to simplify the construction thereof, rendering the same more efficient for the purposes designed, and to make possible increased power for the motor at greatly reduced expenditure of fuel.

Other improvements and novel details in the construction and arrangement of parts will be appreciated from the description to follow, which, for a comprehensive understanding of the invention, should be considered in connection with the accompanying drawings, which form a part hereof, and wherein is disclosed, for the purpose of illustration, a satisfactory embodiment of the invention, though it is to be borne in mind in this connection that obvious changes in matters of detail may be resorted to without departing from the spirit of the invention.

In the drawings:

Figure 1 is a side elevation of a manifold and associated parts in keeping with the invention;

Figure 2 is a longitudinal section, parts being illustrated in elevation, the view being taken substantially on the line 2—2 of Figure 4;

Figure 3 is a longitudinal section, substantially on the line 3—3 of Figure 4;

Figure 4 is a plan view of a complete manifold;

Figure 5 is a cross section substantially on the line 5—5 of Figure 1 and looking in the direction of the arrows;

Figures 6 and 7 are similar views being substantially on the lines 6—6 and 7—7 respectively of Figure 1.

With more particular reference to the drawings wherein like reference numerals refer to corresponding parts throughout the several views, 1 is a body part of a casting, comprising an exhaust manifold, having united to one side thereof and integral therewith, an intake manifold 2 the inner wall 3 of the intake manifold constituting the inner wall of the exhaust manifold, the exhaust manifold chamber being generally indicated by the numeral 4 and the intake manifold chamber by the reference character 5. The exhaust manifold is provided with an unobstructed exhaust outlet or opening 6 at one end thereof, the opposite end being closed, and what may be termed the front wall thereof is provided with exhaust inlets, conveniently round in cross section, and illustrated at 7, 8, 9 and 10, and adapted for direct connection with the exhaust ports of the motor cylinders. The intake manifold is provided with a plurality of fuel supply outlets, conveniently round in cross section, and illustrated on the same side of the manifold as the exhaust inlets, being illustrated at 11 and 12 and adapted for connection with the fuel supply inlets of the motor cylinders.

As clearly illustrated in the drawings, it will be appreciated that the exhaust manifold chamber 4 is continuous from the closed forward end thereof to the exhaust end 6 and is in direct communication with the exhaust inlets, whereas the inlet manifold chamber 5 overlies one wall of the exhaust manifold chamber and is in direct communication with the fuel supply outlets 11 and 12.

Instead of supplying the intake manifold with the fuel direct, it has been found highly desirable to first subject said fuel to a circuitous course, and to this end a supply conduit is provided, which conduit conveniently takes the form of an integral extension of the casting above described. The fuel supply conduit conveniently has a horizontally disposed inlet part 13, adapted for communication with the gas supply or carbureter as the case may be, the horizontally disposed inlet part connecting with a vertical part 14, said parts merging into one another by a curved portion illustrated at 13ª, and the vertically extending part merging by a curved portion 15 into a horizontally extending part 16 which curves round the closed forward end of the exhaust manifold as illustrated at 17 and terminating at a point overlapping the intake manifold as illustrated at 18 and in bent communication with the upper portion of the intake manifold as illustrated at 19. Conveniently the outer wall of the exhaust manifold 1 constitutes the inner wall of the curved portion 17 and horizontal portion 17ª of the fuel supply conduit, and it will be observed that the supply conduit at opposite ends on the horizontally disposed part 16 will be in direct contact with the wall surrounding two of the exhaust inlets of the exhaust manifolds, whereas the curved part 17 and upper horizontal extending part 17ª will be in direct contact throughout with one wall of the exhaust manifold. By reason of this construction, it has been ascertained that the fuel by the time it reaches the intake manifold proper will be substantially completely vaporized owing to the extensive heating or vaporizing surface to which the same has been subjected.

From a reference more particularly to Figures 1, 2 and 3 of the drawings, it will be observed that the diameter of the fuel supply conduit gradually increases at the curved parts 15 and 17, the diameter of the conduit being relatively reduced at opposite sides of the curves, and the fuel is thereby subjected somewhat to a cycloidal action in its passage from the inlet 13 to the intake manifold with the result that the fuel make-up will be completely and thoroughly mixed by the time it reaches the intake manifold, thereby increasing the power of the fuel and overcoming to a large extent carbon deposits.

The fuel supply communicates as heretofore stated at 19 with the intake manifold, as it enters the manifold will tend to continue its previous general direction or towards the fuel supply outlet 12. In order to overcome the tendency therefore of a greater supply of fuel finding its way directly to the fuel supply outlet 12 than to the other for the supply outlet 11, the intake part 19 of the supply is disposed to one side of the center of the intake manifold with the result that the inlet part 19 will be positioned nearer to the fuel supply outlet 11 than the fuel supply outlet 12. By this construction the fuel supply exhausts will receive a more even or equal supply than would otherwise be the case, and to assist in this connection the wall 20 of the intake manifold projects downwardly below the wall 21 thereof, thereby constituting a deflector for the incoming fuel.

The operation may be said to be substantially as follows: The manifold being attached to the motor with the exhaust inlets 7, 8, 9 and 10 connected to the outlet ports of the motor and the fuel supply outlets 11 and 12 with the inlet ports of the motor, the exhaust gases will pass freely through the exhaust chamber 4 of the exhaust manifold and then escape at the end thereof. The exhaust gases in their travel through the exhaust inlets and through the chamber of the exhaust manifold will heat the surrounding walls of these parts. The fuel will be fed from any suitable source, as the carbureter, through the inlet 13 of the fuel supply conduit and as it reaches the enlarged curved part 15 will be subject to the cycloidal mixing effect at the same time being subjected to the vaporizing surface afforded by the adjacent exhaust inlet 8 and surrounding wall of the manifold. As the fuel supply comes in contact with the curved part 17 it is subjected to a similar further mixing action, as well as further vaporization due to the vaporizing surface surrounding the exhaust inlet 7 and manifold chamber 4. As the fuel enters the intake manifold at the point 19 the deflection 20 will tend to interrupt the free passage of the fuel in its theretofore general direction or path, and because of the relative remoteness of the fuel supply exhaust 12 with respect to the fuel supply outlet 11, these outlets will receive a more uniform supply of fuel which at this time is thoroughly and completely vaporized. The fuel supply outlets being arranged in alternate relation with the exhaust inlets, it will be appreciated that up until the time the fuel leads into the motor cylinders proper, the fuel will be subjected to adjacent heated or vaporizing walls. By the present invention it has been demonstrated that the supply of gasoline for a given service may be greatly reduced over what would be the case by the use of prior similar constructions, without decreasing the power of the motor, and in a manner to eliminate to an appreciable extent carbon deposits on the motor parts.

It will be appreciated that, as distinguished from prior constructions with which I am familiar, the fuel is fed through the supply conduit of the manifold, and because of the peculiar construction and arrangement of the latter the temperature of the fuel will be gradually increased during its course of travel through the supply pipe conduit so that by the time the charge has reached the outlet openings of the intake manifold, it will be completely vaporized and therefore in its highest state of efficiency. In other words, the relatively cool charge of fuel that is drawn into the inlet 13 of the manifold will be subjected to an initial heat treatment as it passes beneath the exhaust passage 8. This initial treatment is further augmented as the charge passes around the exhaust passage 7 and as the charge continues in its course of travel through the passage 17ª, which is in direct contact with the upper surface of the exhaust chamber 4, it will be further heated so that all portions thereof will be completely vaporized, which results in a perfect combustible charge for the engine cylinders.

What I claim is:

1. In a manifold construction, the combination of an intake manifold chamber having at its ends fuel supply outlet ports, and intermediate its ends a fuel inlet port, said inlet port being arranged nearer one of said outlet ports than the other, and a deflector formed by the wall of said manifold extending into the path of the incoming fuel to equalize the delivery thereof to the outlet ports.

2. In a manifold construction, the combination of a casting divided to form an exhaust manifold chamber and an intake manifold chamber, the exhaust manifold chamber being provided with exhaust inlets and the inlet manifold with fuel supply outlets arranged in alternate relation with said exhaust inlets, and a fuel supply conduit having a curved part therein of increased diameter relative to that of the major portion thereof.

3. In a manifold construction, the combination of a casting divided to form an exhaust manifold chamber and an intake manifold chamber, the exhaust manifold chamber being provided with exhaust inlets and the inlet manifold with fuel supply outlets arranged in alternate relation with said exhaust inlets, a fuel supply conduit having a curved part therein of increased diameter relative to that of the major portion thereof, the exhaust manifold having an exhaust inlet part in direct contact with said curve of the fuel supply conduit.

4. In a manifold construction, the combination of a casting divided to form an exhaust manifold chamber and an intake manifold chamber, the exhaust manifold chamber being provided with exhaust inlets and the inlet manifold with fuel supply outlets arranged in alternate relation with said exhaust inlets, and a fuel supply conduit having a plurality of curves intermediate its ends, with the diameter of the curves increased relative to that of the major part of said conduit.

5. In combination with an exhaust manifold casing having in one side spaced exhaust inlets, an intake manifold integral with the exhaust manifold and separated from the latter by a common dividing wall, and a fuel supply conduit in communication with the intake manifold, said fuel supply conduit overlying one end and opposite sides of the exhaust manifold, and having an inlet end disposed at an angle to the longitudinal axis of the exhaust manifold and connecting with the body part of the supply conduit by a curve.

6. In a manifold construction, the combination of an elongated exhaust manifold having in one side at the base thereof spaced exhaust inlets, an intake manifold part connected to the exhaust manifold, said manifolds having a common dividing wall, a fuel supply conduit in communication with the intake manifold comprising upper and lower horizontally disposed parts extending along and below the respective upper and lower surfaces of the exhaust manifold and connecting with one another by a part curved about one end of the exhaust manifold, and an inlet end for the supply conduit arranged at a point spaced below the exhaust manifold.

7. In combination, an intake manifold having a plurality of separate fuel supply outlet ports, and a fuel supply inlet common to said ports, means for introducing the fuel in a direction towards one of said outlet ports, and a deflector formed by the wall of said manifold extending into the path of the incoming fuel to deflect the fuel within the manifold.

8. In a manifold construction, the combination of a combined intake and exhaust manifold casting, the exhaust manifold having a closed end and an opposite open discharge end, and a fuel inlet supply pipe projecting below and having relatively spaced contact with the lower surface of the manifold, thence over the closed end thereof and in direct contact therewith and merging into a chamber in the upper portion of the casting, which chamber communicates with the intake manifold.

9. In a manifold construction, the combination of a casting divided vertically to form an exhaust manifold chamber and an intake manifold chamber, the exhaust manifold chamber being provided with exhaust inlets and the intake manifold with fuel supply outlets, and a fuel supply conduit curved about and in direct contact with a plurality of walls of the exhaust manifold and communicating with the intake manifold chamber.

10. In a manifold construction, the combination of a casting divided to form an exhaust manifold chamber and an intake manifold chamber, both of said chambers being in the same horizontal plane, and a fuel supply conduit curved about and arranged in the same vertical plane as the exhaust chamber and communicating with the intake manifold chamber.

In testimony whereof I hereunto affix my signature in the presence of two witnesses.

OSCAR HAYES.

Witnesses:
SAMUEL WINTERS,
H. B. MACGAUHEY.